A. BENDLE.
SPRAG.
APPLICATION FILED MAY 8, 1908.
912,062.
Patented Feb. 9, 1909.
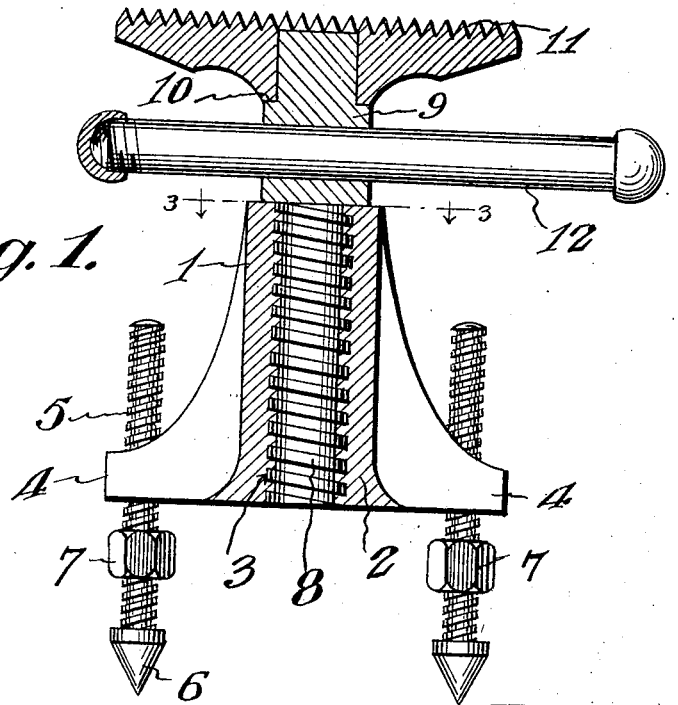
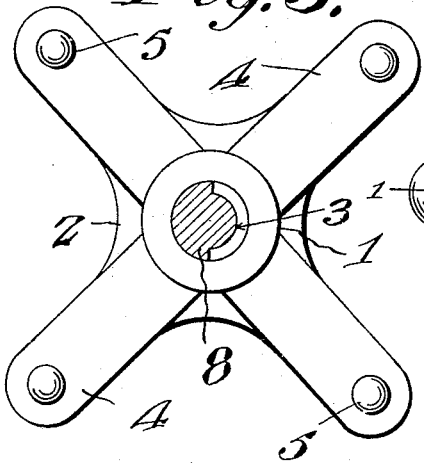
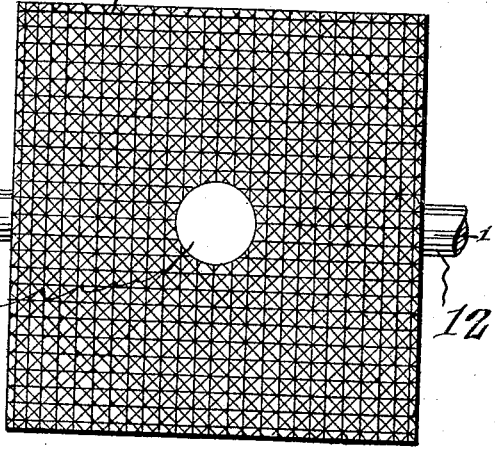
Witnesses:
Joe. P. Waller.
Inventor,
Arthur Bendle.
By Victor J. Evans.
Attorney.

UNITED STATES PATENT OFFICE.

ARTHUR BENDLE, OF JOHNSTOWN, PENNSYLVANIA.

SPRAG.

No. 912,062. Specification of Letters Patent. Patented Feb. 9, 1909.

Application filed May 8, 1908. Serial No. 431,681.

*To all whom it may concern:*

Be it known that I, ARTHUR BENDLE, a citizen of the United States, residing at Johnstown, in the county of Cambria and State of Pennsylvania, have invented new and useful Improvements in Sprags, of which the following is a specification.

This invention relates to sprags for use in coal mines, and the object of the invention is to provide a simple, cheap and efficient device of this character adapted to be placed under the mine strata and adjusted to fit the various angles or slopes to protect the lives of miners by preventing the falling of bodies of coal or slate when undermined.

With these and other objects in view the invention resides in the novel construction of elements and their arrangement in operative combination hereinafter fully described and claimed.

In the accompanying drawings, Figure 1 is a longitudinal sectional view of a sprag constructed in accordance with the present invention and taken upon the line on a plane with the dotted lines 1—1 of Fig. 2. Fig. 2 is a top plan view of the device. Fig. 3 is a horizontal sectional view upon the line 3—3 of Fig. 1.

In the accompanying drawings the numeral 1 designates the body portion of the improved sprag. This body portion 1 is provided with a central tubular member 2, provided with interior screw threads 3, and a plurality of angularly extending legs 4. These legs 4 are each provided with a threaded aperture, adapted for the reception of the screw members 5. These screw members 5 are each provided with a cone-shaped bearing portion 6, preferably formed integral with the screws. The screws 5 are adapted to be adjusted at various heights to provide for the uneven surfaces of the floor of the mine with which they are adapted to engage. The screw members 5 may be also provided with locking nuts 7, adapted to engage the under face of the legs 4 and retain the screws in adjusted position.

The centrally arranged tubular portion of the body has its screw threads 3 adapted for the reception of the threaded member 8 of a central member 9. This member 9 has its upper extremity reduced to provide a shoulder 10 adapted for the reception of the preferably squared toothed head 11 of the device. The central member 9 has its body portion immediately above the threads 8 provided with a transverse slot adapted for the reception of an operating rod 12.

From the above description, it will be apparent that the device may be adjusted to agree with the various angles of the surfaces which it is adapted to engage, and that the device is extremely simple in construction, as well as thoroughly effective in operation. The extension provided upon the central member 9 whereby the head 11 is positioned upon this member is annular in cross section, so as to allow the handle 12 to rotate the screw 8 without interfering with the head 11 by causing it to turn in its engagement.

Having thus fully described the invention what is claimed as new is:

A device for the purpose set forth comprising an interiorly threaded body portion, right angularly disposed leg sections integrally formed with the body and extending outwardly therefrom, said leg sections terminating in a plane with the base of the body and being each provided with a threaded orifice, threaded members having their extremities provided with cone shaped sprags for these openings, locking elements upon these threaded members, a threaded element having a reduced extension for the interiorly threaded body, a removable head upon the extension of the threaded element, teeth upon this head and a handle for revolving the threaded element.

In testimony whereof I affix my signature in presence of two witnesses.

ARTHUR BENDLE.

Witnesses:
ALEX N. HART,
JOHN H. STEPHENS.